United States Patent [19]

Tilgner

[11] 4,430,287
[45] Feb. 7, 1984

[54] REACTION INJECTION MOLDING OF NYLON

[75] Inventor: Peter J. Tilgner, Akron, Ohio

[73] Assignee: The Upjohn Company, Kalamazoo, Mich.

[21] Appl. No.: 400,338

[22] Filed: Jul. 21, 1982

[51] Int. Cl.³ .......................... B29F 1/08; B29G 3/00
[52] U.S. Cl. .................. 264/40.6; 264/328.6; 264/328.18; 264/DIG. 61; 425/143; 425/543
[58] Field of Search .................. 264/DIG. 83, 328.6, 264/40.6, DIG. 61, 328.18; 425/143, 543

[56] References Cited

U.S. PATENT DOCUMENTS

| | | | |
|---|---|---|---|
| 3,984,510 | 10/1976 | Chandra et al. | 264/328.6 X |
| 4,157,427 | 6/1979 | Ferber | 521/133 |
| 4,171,163 | 10/1979 | Hawkins | 366/145 |
| 4,189,070 | 2/1980 | Macosko et al. | 222/134 |

OTHER PUBLICATIONS

Kubiak, Richard S., "The Development of Non-Urethane Materials for Rim Process", in *45th Annual Technical Conference 1980, Reinforced Plastics/Composites Institute, The Society of Plastics Industry, Inc.*, Section 22-6, pp. 1-7.

*Primary Examiner*—Philip E. Anderson

*Attorney, Agent, or Firm*—St. Onge, Steward, Johnston & Reens

[57] ABSTRACT

Method and apparatus for molding polymeric materials using the reaction injection mixing (RIM) technique of combining two or more chemically reactive components immediately prior to their introduction into a mold. The invention is more particularly adapted to RIM molding of polyamide (nylon) type polymers, but is also useful for urethane polymers. In either case the polymers may be of the unfilled or of the reinforced type. Modification of conventional RIM technique is made to meet higher component temperature conditions required for nylon molding as compared to urethane polymers, for example. A characterizing feature of the invention is the employment of an attempering "oil tracer" system comprising casings and jackets enclosing the flow paths of each of the several reactive components, and the flow therethrough of a temperature-controlled oil or other fluid medium in heat-exchange but non-fluid communication with the reactive components. Arrangement is made for zoning the component flow paths, and selectively controlling the delivery of a tempering oil to different zones whereby to provide flexibility of temperature control at different zones.

8 Claims, 1 Drawing Figure

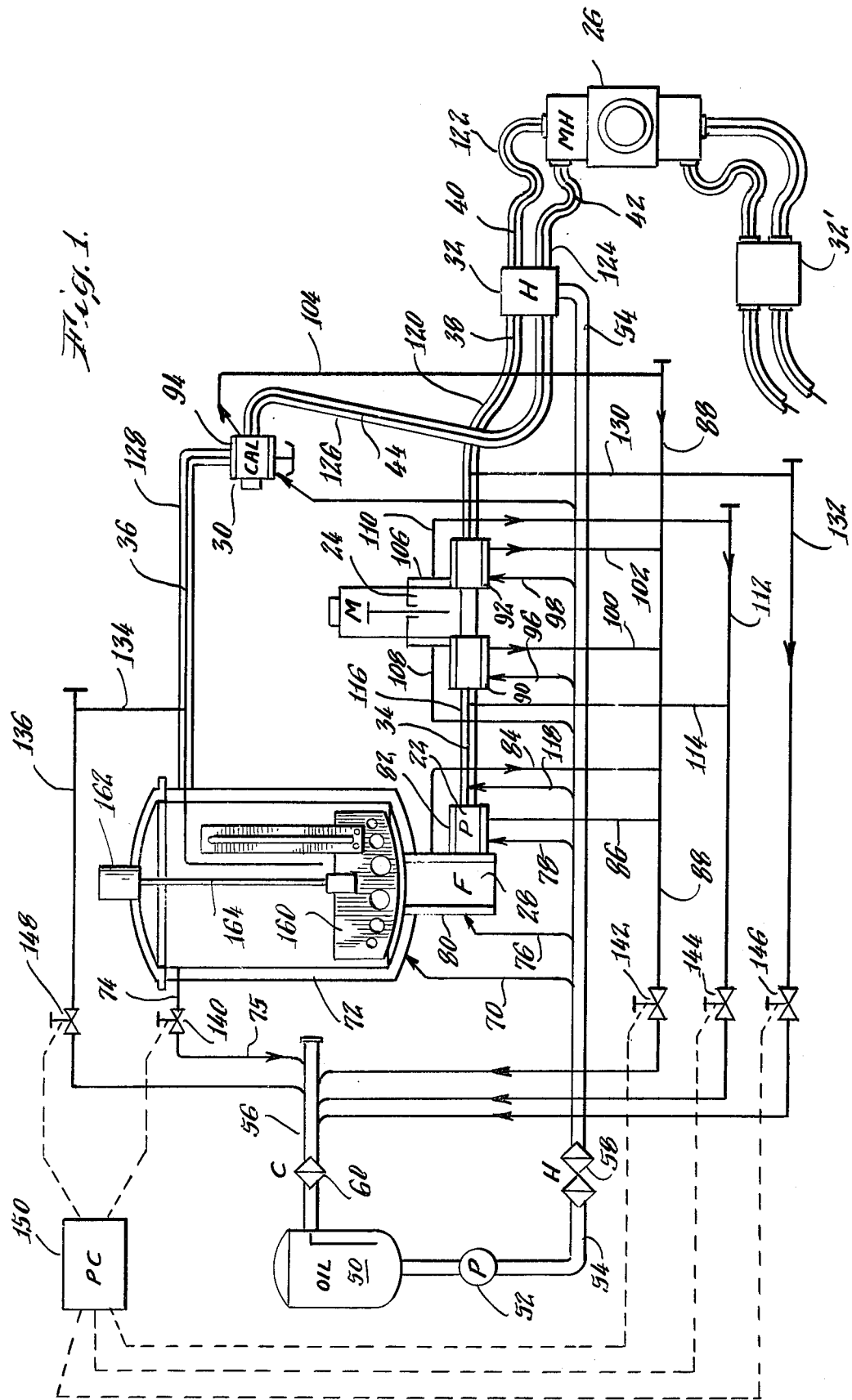

REACTION INJECTION MOLDING OF NYLON

FIELD OF THE INVENTION

The invention relates to apparatus and method for reaction injection mixing of two or more chemically reactive polymerizable liquified components which, in mixed condition is poured into molds and rapidly sets to form shaped articles. The invention is particularly directed to processing of resins by the reaction injection mixing technique where the processing temperatures required are higher than those heretofore generally obtainable with existing equipment. The processing of normally solid caprolactam resins is an example.

PRIOR ART

Reaction injection mixing (RIM) has been very successfully used for years in the molding of isocyanurate (urethane) resins where the system provides substantial economic and functional advantages for many molding applications over other molding techniques such as conventional injection molding. Since polymerizable resins, such as polyamides of the nylon type, represent probably the largest class of engineered thermoplastics used today in automotive, electronic and appliance industries, for example, where the molded parts range in size and weight from a fraction of an ounce to more than ten pounds, the employment of the RIM technique to that class of polymers has presented a natural area for potential development. Nylon 6 for example is one of the principal materials commonly employed, but successful molding of it requires maintaining the reactive component temperatures throughout their flow paths to the mixing head at temperatures above 280° F. That has not been practical in urethane RIM equipment heretofore available, and attempts to rectify the situation by modification of those existing systems has met with little success.

As an example of the approaches taken, slowed-down catalyst-poor nylon block copolymers have been formulated in an attempt to make them suitable for use in available reaction injection mixing without encountering freeze-off of the components. The molding cycles of products produced by that modification are generally unacceptably long, and other problems arise from that approach.

Other attempts have been made to employ conventional RIM apparatus for nylon type resins in which electrical tapes are wrapped around parts of the equipment to supply heat so as to forestall freeze-off. (See U.S. Pat. No. 4,189,070.) The results again have been unsatisfactory.

Another approach tried has been to place the entire RIM apparatus in a hot air environment or to immerse all or part of it in an oil bath. (See U.S. Pat. No. 4,171,163.) Again the results have proved impractical for commercial applications.

Where introduction of reinforcing fillers is made, such as glass fiber which is highly desirable in many applications to increase stiffness, wear-resistance or improve other properties of the molded product, this only serves to complicate the problems encountered with the prior approaches to adapting existing equipment to molding nylon by the RIM technique.

It is accordingly among the primary objects of the present invention to provide apparatus for, and a method of, molding fast-acting polymerizable resins, particularly of the nylon type, while employing the RIM technique; to do this in acceptably short molding cycles, for example in cycles as short as ten seconds to as long as twenty or thirty minutes; and further to facilitate the incorporation in molded nylon parts of reinforcing fillers such as fiberglass and glass flake.

SUMMARY OF THE INVENTION

Solution to the problems encountered by prior attempts to adapt the RIM technique to nylon molding is accomplished in accordance with the invention by provision of apparatus and method characterized by use of what is here termed an attempering oil-tracer system. In this system, casings and jackets enclose essentially all portions of each of the component flow paths of a standard RIM machine, and provide for flow through those jackets and casings of temperature controlled fluid, such as an oil, in heat exchange but non-fluid communication with the several reactive polymer components of the system employed. The invention permits individual adjustment of temperature and heat exchange rate to be applied to each of two or more reactive components throughout their flow paths from the respective supply tank to the mixing head and return. The invention also provides a means for dividing each component flow path into zones where different levels of heat transfer can be maintained so as to provide greater flexibility for handling different polymeric components in different molding operations.

BRIEF DESCRIPTION OF THE DRAWING

The illustration in FIG. 1 is a simplified schematic for purposes of shortened description, showing only one of two or more reactive polymer component systems actually required in a complete RIM system. In actual practice, one or more additional component flow paths, duplicating the one illustrated, connect to the mixing head to provide the complete installation.

DESCRIPTION OF PREFERRED EMBODIMENT

The invention is illustrated for purposes of the preferred embodiment described here by apparatus and method tailored to molding nylon 6 type block polymers using RIM equipment. For this example, the polymer components comprise polypropylene glycol polyol/biscaprolactam chain extender/caprolactam as the "A" side component, and magnesium bromide/caprolactam as the "B" side component. In practice, a commerical heat exchange oil such as Union Carbide Co.'s UCON may be used as the attempering oil in the tracer system, and the system is made capable of maintaining the component temperatures in a range from around 175° F. to 300° F. on each of the component sides. Furthermore, in the illustrated system, zoning of the flow paths on each of the A and B sides is accomplished by individual or grouped attempering oil return flow circuits leading from different zones or portions of the RIM equipment, and the employment in those flow circuits of controllable flow restricting means. It will be apparent that zoning could also be accomplished on the feed side instead of on the return side as specifically illustrated.

In the illustration, the flow path for each reactive component is generally conventional of prior RIM systems. This includes for each component a supply tank, such as tank 20 for what is here designated component A, for maintaining a supply of that component; a similar tank (not shown) is also provided for component B and for each other component if more than two are utilized. In order to keep the normally solid caprolactam component in fluid state, the supply tank is jacketed and heated, as further explained hereinafter.

Component A is continuously withdrawn from tank 20 by a pump 22 which feeds it to a metering device 24 of which several types are commonly used in RIM molding. Such devices accurately determine the volume and the pressure of the reactive component delivered to a mixing chamber (not shown) in a standard RIM mixing head 26 where it is combined by reaction injection mixing with other components and then ejected into a mold. When the RIM system is in a non-molding or "recirculation" mode, component A is shunted past the metering device and through a bypass around the mixing chamber of head 26, being returned by suitable ducting to supply tank 20. As in conventional RIM systems, a filter 28 and a calibration device 30 are provided in the flow path of the present system, but the usually employed heat exchanger of prior systems is replaced in this instance by a header 32 and other means presently to be described.

Rigid ducting, such as that shown at 34 and 36, respectively, for component supply and return, connect pump 22 to metering device 24, and also calibration device 30 to supply tank 20. Flexible ducting 38, 40 connect metering device 24 to header 32 and mixing head 26, respectively, supplying component A to the head, while other flexible ducting 42, 44 connect the head to header 22 and calibrator 30, respectively, on the return flow side.

So much of the system is generally standard. The further modification of it which characterizes this invention will now be described in more detail.

In accordance with the invention, the flow path of component A is enclosed from the supply tank 20 to the mixing head 26 by casings and jackets which surround, in spaced relation thereto, all elements of the component A flow path, providing a parallel flow path for an attempering or temperature regulating fluid in heat transfer relation in respect of the reactive component. Here again, for simplification of description, only one attempering fluid flow path is illustrated, but it will be understood that this is duplicated for each of the other reactive components employed in a complete RIM system.

The attempering fluid flow circuit includes a reservoir 50, a circulating pump 52, a supply manifold 54, a main return manifold 56, and heat exchange means 58, 60 located in the several manifolds. External sources (not shown) of heat and/or cooling are connected to the respective exchangers 58 and 60.

Branching supply ducts are connected into manifold 54 to supply the casings and jackets surrounding each element or portion of the RIM component system with attempering fluid. In addition, there is a network of auxiliary return branch ducts and auxiliary return manifolds which direct the attempering fluid back to the main return manifold 56 and to reservoir 50. Thus, duct 70 is "teed" into supply manifold 54 and feeds jacket 72 of component tank 20. Return from this jacket is provided by a return branch duct 74 leading into an auxiliary manifold 75 which in turn leads into main return manifold 56. Similarly, branch ducts 76, 78 supply attempering fluid from manifold 50 to casings 80, 82 surrounding filter 28 and pump 22, respectively. On the return side, these same casings are connected by branch ducts 84, 86 to a second auxiliary return manifold 88, which again feeds into the main return manifold 56. Lower casings 90, 92 of metering device 24, and casing 94 of calibrating device 30, are similarly connected to supply manifold 54 by branch ducts 96, 98, and to auxiliary return manifold 88 by ducts 100, 102 and 104, respectively. The upper casing 106 of metering device 24 is served by supply branch 108 from manifold 54, while its return branch 110 "tees" into a third auxiliary return manifold 112. This same manifold 112 also serves for return through branch duct 114 of attempering fluid in jacket 116 surrounding rigid duct 34 connecting the reactive component pump to the metering device. Supply of attempering fluid to jacket 116 is provided by branch 118 from manifold 54.

Attempering fluid is supplied through a header 32, fed by manifold 54, to jackets 120, 122, 124 and 126 surrounding the several flexible ducts 38, 40, 42 and 44, respectively. These flexible ducts interconnect mixing head 26 with metering device 24 and calibrating device 30. Jacket 128 surrounding rigid duct 36, which connects the calibrating device to supply tank 20, is also supplied with attempering fluid from manifold 54 through this network. Return flow from jacket 120 is effected by return branch 130 to still another auxiliary manifold 132, while return flow from jackets 122, 124, 126 and 128 is through return branch 134 to yet another auxiliary manifold 136.

In each of the several auxiliary return manifolds, downstream of all return branches, there is placed a controllable restrictor valve for modulating the flow rate through the respective manifolds. Thus restrictor valves 140, 142, 144, 146 and 148 are located in respective auxiliary manifolds 75, 88, 112, 132 and 136, ahead of the connection of these to the main return manifold 56. These restrictor valves are automatically controlled by a programmable controller 150, by which the flow rate of attempering fluid for the respective branch circuits is modulated to maintain preselected temperature conditions of the reactive component material passing through different zones determined by the jacketing arrangement.

The particular zoning arrangement illustrated is purely exemplary. Different zoning arrangements from that specifically illustrated are of course readily effected by changing the manner of connecting the feed and return branches for the attempering fluid to different portions of the apparatus and to different auxiliary return manifolds.

The novel system is found to provide improvement in the molding of filled nylon parts incorporating a flake-type glass filling or reinforcing component. This flake glass, in which the particles are generally flat triangular shaped flakes is used in place of the conventional milled fiberglass type of reinforcing. The use in RIM molding of milled glass fiber, as heretofore practised in urethane molding for purposes of reinforcement, has been found to produce orientation of the fibers in the molded products, orienting the fibers parallel to the flow path of the material entering the mold. The resulting products have accordingly exhibited greater stiffness in the direction of axial orientation than in directions transverse thereto. Warping is commonly encountered in parts so molded, especially in the case of broad, flat area, molded parts such as automobile door panels. That problem is substantially relieved by use of glass flake material, presumably since the flake material by virtue of its shape is far less subject to flow-oriented alignment in the finished product. The resulting random positioning of the flakes in the products thus afords a more uniform stiffness in all directions. Excessively fast wear of the molding equipment, especially the usual RIM head plunger, however, has been a major problem heretofore. Incorporation of flake glass reinforcement in one or more of the reactive components in the modified RIM system here disclosed, however, has shown substantial improvement in this respect. Flexibility of temperature control afforded throughout different zones of the component flow paths to the mixing head, which is provided by the present invention, facilitates the flake incorporation. Uniformity of dispersion of the flakes is improved further by providing low RPM agitator means, such as a foraminous paddle 160, in supply tank 20. A motor 162 on the tank serves to drive the paddle through a suitable shaft 164. Milled fiber glass incorporation, using the invention, is also possible.

Although a specific embodiment of the invention has been described in detail above, it is understood that this has been for purposes of illustration of the inventive concept and modifications can of course be made by those skilled in the art without departing from that concept. The use of branched feed ducts and restricting means in them for feeding attempering fluid to the different zones, instead of utilizing the return ducts for control purposes, is an example. Obviously different zoning arrangements are also possible from what is here specifically shown. Similarly, other types of polymers than nylon 6, and/or the employment of more than two components, are possible within the teaching of the invention. These and similar changes are accordingly intended to be comprehended by the following claims.

What is claimed is:

1. The method of molding polymeric materials by the reaction injection mixing (RIM) process of combining two or more chemically reactive polymer components in a mixing head immediately prior to introducing the combined components into a mold, comprising the steps of:
A. providing RIM equipment comprising;
  (1) a RIM mixing head;
  (2) a supply tank, feed pump, volumetric metering and pressurizing means, and supply and recycle ducting interconnecting said tank, pump and metering means with said metering head for each reactive component employed in the RIM process, establishing separate flow paths for each of said reactive components to and from said mixing head; and
  (3) an attempering fluid system in heat-exchange but non-flow communication with each of said reactive component flow paths, said attempering system comprising for each reactive component flow path:
    (a) an attempering fluid reservoir, a circulating pump, a supply manifold fed by said pump, a return manifold connected to said reservoir for return of attempering fluid thereto;
    (b) heat exchange means in at least one of said manifolds for regulating the temperature of said attempering fluid;
    (c) casings and jackets enclosing all portions of the reactive component flow path;
    (d) a supply duct system connecting said casings and jackets to said supply manifold for feeding attempering fluid to said casings and jackets and forming multiple zones along the reactive component flow path;
    (e) a return duct system connecting said casings and jackets to said return manifold; and
    (f) variable flow restrictor means in at least one of said duct systems;
B. selectively varying the attempering fluid flow in a selected zone differently from that in other zones along the flow path of the reactive component by controlling the settings of said flow restrictor means.

2. The method of claim 1 which includes the step of controlling said restrictor means by use of a programable controller.

3. The method of claim 1 which further includes the step of introducing into at least one of said component supply tanks milled or flake-type glass filling as a reinforcement for products molded in accordance with the method, and stirring said reactive component in said tank to maintain said filler in substantially uniform suspension.

4. Apparatus for molding polymeric materials using the reaction injection mixing (RIM) process of combining two or more chemically reactive polymer compnents in a mixing head immediately prior to introducing the combined components into a mold, comprising in combination:
(1) a RIM mixing head;
(2) a supply tank, feed pump, volumetric metering and pressurizing means, and supply and recycle ducting interconnecting said tank, pump and metering means with said mixing head for each reactive component employed in the RIM process, establishing separate flow paths for each of said reactive components to and from said mixing head; and
(3) an attempering fluid system in heat-exchange but non-flow communication with each of said reactive component flow paths, said attempering system comprising for each reactive component flow path:
  (a) an attempering fluid reservoir, a circulating pump, a supply manifold fed by said pump, a return manifold connected to said reservoir for return of attempering fluid thereto;
  (b) heat exchange means in at least one of said manifolds for regulating the temperature of said attempering fluid;
  (c) casings and jackets enclosing all portions of the reactive component flow path;
  (d) a supply duct system connecting said casings and jackets to said supply manifold for feeding attempering fluid to said casings and jackets and forming multiple zones along the reactive component flow path;
  (e) a return duct system connectoing said casings and jackets to said return manifold; and
  (f) variable flow restrictor means in at least one of said duct systems for selectively varying the attempering fluid flow in a selected zone different from that in other zones along the flow path of the reactive component.

5. The combination as defined in claim 4, wherein said variable flow restrictor means is located in the return duct system.

6. The combination as defined in claim 2 wherein said return duct system includes at least two auxiliary return manifolds, the return ducts from said casings and jackets feeding into different of said auxiliary return manifolds.

7. The combination as defined in claim 6 wherein said restrictor means is located in said auxiliary return manifolds between said return ducts and said main return manifold.

8. The combination as defined in claim 4 which further includes programable controller means for automatically controlling said restrictor means.

* * * * *

UNITED STATES PATENT OFFICE
CERTIFICATE OF CORRECTION

Patent No. 4,430,287  Dated February 7, 1984

Inventor(s) Peter J. Tilgner

It is certified that error appears in the above-identified patent and that said Letters Patent are hereby corrected as shown below:

Abstract, line 21 "a tempering" should read --attempering--.
Column 3, line 30 "header 22" should read --header 32--.
Column 6, claim 4, lines 18 and 19 "compnents" should read --components--; line 47 "connectoing" should read --connecting--. Column 6, claim 6, line 56 "as defined in claim 2 should read --as defined in claim 5--.

Signed and Sealed this

Thirty-first Day of July 1984

[SEAL]

Attest:

Attesting Officer

GERALD J. MOSSINGHOFF

Commissioner of Patents and Trademarks